United States Patent Office 2,958,680
Patented Nov. 1, 1960

2,958,680

CHLOROPRENE POLYMERS CONTAINING TRIALKYL THIOUREA ACCELERATORS

Lester A. Brooks, East Norwalk, and Jack C. Bacon, Noroton Heights, Conn., assignors to R. T. Vanderbilt Company, Inc., New York, N.Y., a corporation of New York No Drawing. Filed June 15, 1956, Ser. No. 591,519

20 Claims. (Cl. 260—79.5)

The present invention relates to the vulcanization of chloroprene polymers containing novel accelerators and especially to the vulcanization of the chloroprene polymer known as neoprene type W.

Chloroprene polymers or neoprene are polymers of 2-chloro-1,3-butadiene (chloroprene) and copolymers of chloroprene with dienes or vinyl compounds in which chloroprene comprises the predominant monomer. These polymers or copolymers are usually made in aqueous emulsions and are available to the rubber trade under such names as GR-M, neoprene type GN, neoprene type GNA, neoprene type FR, neoprene type E, neoprene type K, neoprene type KNR, neoprene type W, and neoprene type WRT. The various types of polychloroprene or neoprene differ one from the other in the modifier used in controlling the degree of polymerization of chloroprene, typical modifiers being sulfur, sulfur dioxide, hydrogen sulfide, mercaptans, iodine compounds, and aromatic azo compounds. The chloroprene polymer which has found wide commercial acceptance because of its uniformity in molecular weight distribution and useful properties is neoprene type W, a compound which contains no sulfur, thiuram disulfide, or other compound capable of decomposing to yield either free sulfur or a vulcanization accelerator.

Polychloroprenes differ greatly from other synthetic rubbers and from natural rubber in the manner in which they can be vulcanized. In general, excellent vulcanizates may be obtained from polychloroprenes by incorporating certain metallic oxides, such as zinc oxide and magnesia, into the plastic polychloroprene and heating to effect vulcanization. For certain applications litharge is recommended for use in place of the zinc oxide and magnesia, while for some types sulfur is recommended but is not necessary to effect vulcanization.

When a more rapid rate of cure is desired than is afforded by the metallic oxides alone, it has been the custom of the rubber trade to employ certain organic compounds as accelerators in conjunction with these metallic oxides. Thiocarbanilide or N,N'-diphenylthiourea is an example of an accelerator which has been used heretofore in the vulcanization of natural rubber, while catechol and hexamethylenetetramine are examples of previously used accelerators in the vulcanization of polychloroprene. The accelerator which has proved most effective in the vulcanization of polychloroprene, however, is ethylenethiourea. The heretofore known accelerators, especially ethylenethiourea, however, are too scorchy, i.e., they are so active at relatively low temperatures that the polychloroprene is liable to cure prematurely or "scorch" during processing and accordingly cause economic losses. In addition, the heretofore known accelerators do not always impart to the vulcanizates the desired physical properties.

Accordingly, it is an object of the present invention to provide a novel group of accelerators for the vulcanization of chloroprene polymers and especially for the vulcanization of the chloroprene polymer known as neoprene type W which will impart to the vulcanizates good physical properties. It is, however, the principal object of the invention to provide accelerators which do not show undesirable scorchy properties compared to ethylenethiourea.

The accelerators of the present invention are thiourea accelerators having the general formula

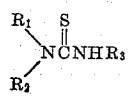

where $R_1$, $R_2$ and $R_3$ are radicals selected from the group consisting of alkyl radicals having from 1 to 6 carbon atoms, alicyclic radicals having from 3 to 6 carbon atoms, aryl radicals having from 6 to 10 carbon atoms, and aralkyl radicals having from 7 to 10 carbon atoms. It will be appreciated that $R_1$, $R_2$ and $R_3$ may be the same or different radicals and that the alkyl radicals may be straight or branched chain. The accelerators of the invention include, for example, N-phenyl - N' - methyl - N' - cyclohexylthiourea, N-phenyl-N'-butyl - N' - alpha - methylbenzylthiourea, N - phenyl-N'-butyl-N'-benzylthiourea, N,N'-diphenyl-N'-benzylthiourea, N-phenyl-N',N'-diethylthiourea, N,N'-diethyl-N'-phenylthiourea, N,N',N'-tripentylthiourea, N,N',N'-triphenylthiourea, N-propyl-N'-ethyl-N'-pentylthiourea, N-ethyl - N',N' - dimethylthiourea, N - isopropyl - N',N'-dimethylthiourea, N-tertiary-butyl-N',N'-dimethylthiourea, N-butyl-N',N'-dimethylthiourea, N,N',N'-tributylthiourea, N-phenyl-N',N'-dimethylthiourea, N-butyl-N', N'-diethylthiourea, N,N',N'-triethylthiourea, and N-ethyl-N',N'-diisopropylthiourea.

The thiourea accelerators may be prepared by classical methods among which there is the reaction of a secondary amine with an isothiocyanate as shown by the following equation:

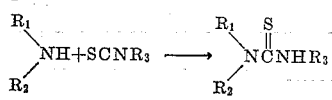

where $R_1$, $R_2$ and $R_3$ are as above. A specific illustration of this method of preparation as applied to the preparation of N-phenyl-N',N'-diethylthiourea is as follows:

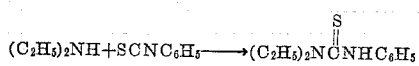

Further details concerning this method of preparation as well as other methods may be readily obtained by reference to the article titled "Thioureas" appearing in Chemical Reviews, volume 55, pages 181–228 (1955) by Dorothy C. Schroeder.

The amount of thiourea accelerator which may be employed in the vulcanization of polychloroprene stock may vary over a broad range. In general, from about 0.05% to about 5.0% of the thiourea accelerator based on the weight of the chloroprene polymer is employed. It is preferred to use from about 0.5% to about 1.0% of the thiourea accelerator based on the weight of the chloroprene polymer present in the stock to be vulcanized.

The accelerators of the invention may be used with ingredients commonly employed in the compounding of polychloroprene elastomers. For example, the accelerators may be used in conjunction with antioxidants, fillers, colors, metallic oxides, softeners, and the like.

The invention will be further illustrated in connection with the data pertaining to Table I below.

A typical polychloroprene, namely neoprene type W, was compounded by milling together the ingredients in the following base formula:

| Components: | Parts by weight |
|---|---|
| Neoprene type W | 100 |
| Stearic acid | 0.5 |
| Zinc oxide | 5 |
| Extra light calcined magnesium oxide | 2 |
| Agerite stalite | 2 |
| P-33 Black | 75 |
| Accelerator | 0.5 |

In the above polychloroprene stock agerite stalite is a proprietary antioxidant composition composed of octylated diphenylamines and P-33 Black is a proprietary composition of fine thermal carbon black. The polychloroprene stock was vulcanized by air curing at a temperature of 307° F. for varying lengths of time as shown in Table I below. The vulcanizate was tested for Mooney scorch, and physical properties, such as stress, tensile strength, elongation, and hardness. Vulcanizates were prepared using representative accelerators of the invention as well as the best heretofore known accelerators, i.e., thiocarbanilide and ethylenethiourea. In Table I below the accelerators designated by numbers 1 through 14 are respectively (1) N-phenyl-N'-methyl-N'-cyclohexylthiourea, (2) N-phenyl-N'-butyl-N'-alpha-methylbenzylthiourea, (3) N-phenyl-N'-butyl-N'-benzylthiourea, (4) N,N'-diphenyl-N'-benzylthiourea, (5) N-phenyl - N,N' - diethylthiourea, (6) N,N' - diethyl-N'-phenylthiourea, (7) N-ethyl-N',N'-dimethylthiourea, (8) N-isopropyl-N',N'-dimethylthiourea, (9) N-tertiary-butyl - N',N' - dimethylthiourea, (10) N - butyl - N',N' - dimethylthiourea, (11) N,N',N' - tributylthiourea, (12) N-phenyl-N',N'-dimethylthiourea, (13) N-butyl-N',N'-diethylthiourea, and (14) N,N',N'-triethylthiourea.

urea, as shown by the higher Mooney scorch values. The physical properties of the vulcanizates were satisfactory. It will be appreciated that other accelerators of the invention may also be employed with comparable results and that the accelerators of the invention may be employed with chloroprene polymers other than neoprene type W.

Various modifications and changes may be made in the invention herein set forth without departing from the spirit thereof and accordingly the invention is to be limited only within the scope of the appended claims.

We claim:

1. A vulcanizable polychloroprene composition comprising an unvulcanized chloroprene polymer and from about 0.05% to about 5.0% of the weight of the polymer of a thiourea accelerator having the general formula

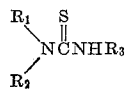

where $R_1$, $R_2$ and $R_3$ are alkyl radicals having from 1 to 6 carbon atoms.

2. A vulcanizable polychloroprene composition comprising an unvulcanized chloroprene polymer and from about 0.5% to about 1.0% of the weight of the polymer of a thiourea accelerator having the general formula

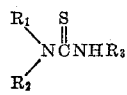

where $R_1$, $R_2$, and $R_3$ are alkyl radicals having from 1 to 6 carbon atoms.

3. A vulcanizable polychloroprene composition comprising sulfur free polychloroprene and from about 0.05%

Table I

| Accelerator | 1 | 2 | 3 | 4 | 5 | 6 | 7 | 8 | 9 | 10 | 11 | 12 | 13 | 14 | Thiocarbanilide | Ethylenethiourea |
|---|---|---|---|---|---|---|---|---|---|---|---|---|---|---|---|---|
| MOONEY SCORCH AT 250° F. (5 POINT RISE) | | | | | | | | | | | | | | | | |
| Air Cure in Minutes at 307° F | 16 | 27 | 25 | 22 | 15 | 32 | 11 | 13 | 14 | 16 | 15 | 16 | 16 | 19 | 13 | 6 |
| STRESS IN P.S.I. AT 300% ELONGATION | | | | | | | | | | | | | | | | |
| 10 | 400 | 480 | 450 | 370 | 480 | 480 | 1,300 | 980 | 890 | 740 | 1,100 | 680 | 840 | 580 | 1,100 | 1,390 |
| 20 | 650 | 650 | 610 | 720 | 770 | 950 | 1,570 | 1,350 | 1,270 | 1,120 | 1,330 | 1,090 | 1,200 | 900 | 1,140 | 1,665 |
| 30 | 790 | 760 | 730 | 850 | 930 | 1,100 | 1,720 | 1,500 | 1,390 | 1,270 | 1,480 | 1,220 | 1,360 | 1,100 | 1,220 | 1,770 |
| 45 | 880 | 850 | 870 | 890 | 1,070 | 1,190 | 1,820 | 1,540 | 1,490 | 1,420 | 1,530 | 1,360 | 1,480 | 1,200 | 1,270 | 1,865 |
| TENSILE STRENGTH IN P.S.I. | | | | | | | | | | | | | | | | |
| 10 | 1,390 | 1,210 | 1,310 | 1,300 | 1,510 | 1,610 | 2,230 | 1,820 | 1,840 | 1,810 | 1,950 | 1,830 | 1,900 | 1,780 | 2,310 | 2,200 |
| 20 | 1,980 | 1,720 | 1,950 | 2,050 | 2,060 | 2,190 | 2,380 | 2,050 | 1,950 | 1,950 | 2,070 | 2,030 | 2,100 | 2,050 | 2,310 | 2,355 |
| 30 | 2,250 | 2,050 | 2,170 | 2,160 | 2,290 | 2,280 | 2,390 | 2,130 | 2,020 | 2,010 | 2,120 | 2,080 | 2,170 | 2,090 | 2,380 | 2,425 |
| 45 | 2,370 | 2,320 | 2,400 | 2,240 | 2,340 | 2,320 | 2,450 | 2,160 | 2,100 | 2,080 | 2,160 | 2,120 | 2,200 | 2,120 | 2,380 | 2,475 |
| PERCENT ELONGATION AT BREAK | | | | | | | | | | | | | | | | |
| 10 | 880 | 770 | 810 | 880 | 860 | 850 | 580 | 650 | 670 | 730 | 640 | 760 | 720 | 830 | 590 | 525 |
| 20 | 760 | 760 | 780 | 680 | 710 | 600 | 510 | 550 | 580 | 610 | 520 | 620 | 580 | 670 | 560 | 455 |
| 30 | 710 | 740 | 750 | 630 | 630 | 580 | 470 | 540 | 530 | 540 | 520 | 580 | 530 | 590 | 560 | 435 |
| 45 | 660 | 710 | 740 | 610 | 580 | 560 | 460 | 500 | 500 | 520 | 520 | 570 | 530 | 550 | 530 | 420 |
| SHORE HARDNESS NO. | | | | | | | | | | | | | | | | |
| 10 | 45 | 60 | 53 | 50 | 45 | 47 | 59 | 53 | 55 | 52 | 56 | 51 | 53 | 50 | 50 | 61 |
| 20 | 52 | 62 | 56 | 55 | 51 | 54 | 61 | 57 | 58 | 57 | 58 | 55 | 56 | 54 | 52 | 62 |
| 30 | 54 | 62 | 56 | 56 | 56 | 55 | 63 | 59 | 59 | 59 | 60 | 57 | 59 | 55 | 53 | 63 |
| 45 | 56 | 65 | 58 | 56 | 55 | 56 | 63 | 60 | 61 | 60 | 61 | 58 | 60 | 57 | 55 | 64 |

From a study of the data presented above in Table I it may be readily seen that the thiourea accelerators of the invention all cure chloroprene polymers such as neoprene type W. In addition, all of the accelerators of the invention are considerably less scorchy than is the best heretofore known accelerator, namely ethylenethioto about 5.0% of the weight of the polymer of a thiourea accelerator having the general formula

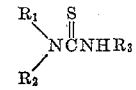

where $R_1$, $R_2$ and $R_3$ are alkyl radicals having from 1 to 6 carbon atoms.

4. A vulcanizable polychloroprene composition comprising sulfur free polychloroprene and from about 0.5% to about 1.0% of the weight of the polymer of a thiourea accelerator having the general formula

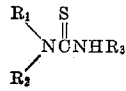

where $R_1$, $R_2$ and $R_3$ are alkyl radicals having from 1 to 6 carbon atoms.

5. The process of vulcanizing chloroprene polymers comprising incorporating in a chloroprene polymer stock from about 0.05% to about 5.0% of the weight of the polymer of a thiourea accelerator having the general formula

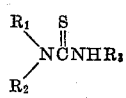

wherein $R_1$, $R_2$ and $R_3$ are alkyl radicals having from 1 to 6 carbon atoms, and heating at vulcanizing temperatures to cure the polymer.

6. The process of vulcanizing chloroprene polymers comprising incorporating in a chloroprene polymer stock from about 0.5% to about 1.0% of the weight of the polymer of a thiourea accelerator having the general formula

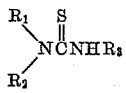

where $R_1$, $R_2$ and $R_3$ are alkyl radicals having from 1 to 6 carbon atoms, and heating at vulcanizing temperatures to cure the polymer.

7. The process of vulcanizing chloroprene polymers comprising incorporating in a sulfur free polychloroprene stock from about 0.05% to about 5.0% of the weight of the polymer of a thiourea accelerator having the general formula

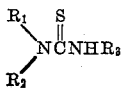

where $R_1$, $R_2$ and $R_3$ are alkyl radicals having from 1 to 6 carbon atoms, and heating at vulcanizing temperatures to cure the polymer.

8. The process of vulcanizing chloroprene polymers comprising incorporating in a sulfur free polychloroprene stock from about 0.5% to about 1.0% of the weight of the polymer of a thiourea accelerator having the general formula

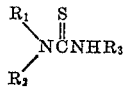

where $R_1$, $R_2$ and $R_3$ are alkyl radicals having from 1 to 6 carbon atoms, and heating at vulcanizing temperatures to cure the polymer.

9. A composition as set forth in claim 2 wherein the thiourea accelerator is N-ethyl-N',N'-dimethylthiourea.

10. A composition as set forth in claim 4 wherein the thiourea accelerator is N-ethyl-N',N'-dimethylthiourea.

11. The process as set forth in claim 6 wherein the thiourea accelerator is N-ethyl-N',N'-dimethylthiourea.

12. The process as set forth in claim 8 wherein the thiourea accelerator is N-ethyl-N',N'-dimethylthiourea.

13. A composition as set forth in claim 2 wherein the thiourea accelerator is N,N'N'-triethylthiourea.

14. A composition as set forth in claim 4 wherein the thiourea accelerator is N,N',N'-triethylthiourea.

15. The process as set forth in claim 6 wherein the thiourea accelerator is N,N',N'-triethylthiourea.

16. The process as set forth in claim 8 wherein the thiourea accelerator is N,N',N'-triethylthiourea.

17. A composition as set forth in claim 2 wherein the thiourea accelerator is N,N',N'-trimethylthiourea.

18. A composition as set forth in claim 4 wherein the thiourea accelecator is N,N',N'-trimethylthiourea.

19. The process as set forth in claim 6 wherein the thiourea accelerator is N,N',N'-trimethylthiourea.

20. The process as set forth in claim 8 wherein the thiourea accelerator is N,N',N'-trimethylthiourea.

References Cited in the file of this patent
UNITED STATES PATENTS

| | | |
|---|---|---|
| 2,544,746 | Baum | Mar. 13, 1959 |
| 2,804,447 | Naylor | Aug. 27, 1957 |

OTHER REFERENCES

Davis et al.: Chem & Tech of Rubber, Rheinhold Pub. Co., 1937, page 311.